（12）United States Patent
Mori et al.

(10) Patent No.: US 10,661,369 B2
(45) Date of Patent: May 26, 2020

(54) ELECTRODE, ELECTROCHEMICAL MACHINING APPARATUS USING THE ELECTRODE, ELECTROCHEMICAL MACHINING METHOD, AND PRODUCT MACHINED BY THE METHOD

(71) Applicant: HODEN SEIMITSU KAKO KENKYUSHO CO., LTD., Atsugi-shi, Kanagawa (JP)

(72) Inventors: Takayuki Mori, Okayama (JP); Hiroyuki Sunada, Okayama (JP); Hirotaro Hosoe, Kanagawa (JP)

(73) Assignee: HODEN SEIMITSU KAKO KENKYUSHO CO., LTD., Atsugi-shi, Kanagawa (JP)

( * ) Notice: Subject to any disclaimer, the term of this patent is extended or adjusted under 35 U.S.C. 154(b) by 2 days.

(21) Appl. No.: 15/903,450

(22) Filed: Feb. 23, 2018

(65) Prior Publication Data

US 2018/0185943 A1 Jul. 5, 2018

Related U.S. Application Data

(62) Division of application No. 14/440,374, filed as application No. PCT/JP2013/079602 on Oct. 31, 2013.

(30) Foreign Application Priority Data

Nov. 8, 2012 (JP) ................................. 2012-246103

(51) Int. Cl.
   *B23H 9/10* (2006.01)
   *B23H 9/14* (2006.01)
   (Continued)

(52) U.S. Cl.
   CPC ................ *B23H 3/06* (2013.01); *B23H 3/02* (2013.01); *B23H 3/04* (2013.01); *B23H 9/10* (2013.01);
   (Continued)

(58) Field of Classification Search
   CPC ............... B23H 3/04; B23H 9/14; B23H 9/10
   See application file for complete search history.

(56) References Cited

U.S. PATENT DOCUMENTS 5,002,643 A    3/1991  Andrews
5,059,289 A *  10/1991  Gaskell .................. F02M 61/16
                                             205/665

(Continued)

FOREIGN PATENT DOCUMENTS

JP        7-51948 A      2/1995
JP        7-314258 A    12/1995
(Continued)

OTHER PUBLICATIONS

International Search Report for PCT/JP2013/079602 dated Dec. 24, 2013.
(Continued)

*Primary Examiner* — Brian W Cohen
(74) *Attorney, Agent, or Firm* — Sughrue Mion, PLLC

(57) ABSTRACT

Provided is an electrode capable of increasing a degree of freedom in machining shape with a simple structure, an electrochemical machining apparatus using the electrode, an electrochemical machining method, and a product machined by the method. An electrode 4 has a core tube 41 formed of a material by which a second hole 101*b* having a direction or a curvature different from that of a first hole 101*a* having a predetermined curvature can be formed continuously from the first hole 101*a* and a coating 42 fixed to an outer periphery of the core tube 41.

6 Claims, 11 Drawing Sheets

(51) Int. Cl.
  *B23H 9/16* (2006.01)
  *B23H 7/22* (2006.01)
  *B23H 7/24* (2006.01)
  *B23H 3/06* (2006.01)
  *B23H 3/04* (2006.01)
  *B23H 3/02* (2006.01)
  *B23H 7/26* (2006.01)

(52) U.S. Cl.
  CPC ............... *B23H 9/14* (2013.01); *B23H 9/16* (2013.01); *B23H 7/22* (2013.01); *B23H 7/26* (2013.01); *Y10T 428/24273* (2015.01)

(56) References Cited

U.S. PATENT DOCUMENTS

| | | |
|---|---|---|
| 7,014,722 B1 | 3/2006 | Arimoto |
| 2002/0174922 A1 | 11/2002 | Ishii et al. |
| 2006/0068214 A1 | 3/2006 | Gigliotti et al. |
| 2009/0286622 A1 | 11/2009 | Yokota |
| 2010/0063478 A1 | 3/2010 | Selkee |
| 2011/0070096 A1 | 3/2011 | Wei |
| 2011/0223004 A1* | 9/2011 | Lacy ............... F01D 5/187 415/115 |

FOREIGN PATENT DOCUMENTS

| | | |
|---|---|---|
| JP | 2000-42834 A | 2/2000 |
| JP | 2001-81537 A | 3/2001 |
| JP | 2006-124830 A | 5/2006 |
| JP | 2009-24223 A | 2/2009 |
| JP | 2009-273579 A | 11/2009 |
| JP | 2010-63887 A | 3/2010 |
| JP | 2011-62811 A | 3/2011 |

OTHER PUBLICATIONS

English machine translation of JP 2000-042834, JPO, accessed Jun. 27, 2016.

* cited by examiner

ELECTRODE, ELECTROCHEMICAL MACHINING APPARATUS USING THE ELECTRODE, ELECTROCHEMICAL MACHINING METHOD, AND PRODUCT MACHINED BY THE METHOD

This is a divisional of U.S. application Ser. No. 14/440,374 filed May 4, 2015, which is a National Stage of International Application No.: PCT/JP2013/079602, filed Oct. 31, 2013, claiming priority based on Japanese Patent Application No. 2012-246103, filed Nov. 8, 2012, the contents of all of which are incorporated herein by reference in their entirety.

TECHNICAL FIELD

The present invention relates to an electrode used to form a bent hole in a workpiece, an electrochemical machining apparatus using the electrode, an electrochemical machining method, and a product machined by the method.

BACKGROUND ART

There is conventionally disclosed an electrochemical machining method that forms a bent hole in a workpiece formed of a metal material by adjusting an exposed area of an electrode provided at a tip end of a flexible member (see Patent Document 1). Further, there is disclosed an electrochemical machining method that forms a bent hole by changing a way of applying a potential to two or more electrically-independent electrodes provided at a tip end (see Patent Document 2). Furthermore, there is disclosed an electrochemical machining method that uses a hollow bent insulation-coated electrode to form a bent hole (see Patent Document 3).

CITATION LIST

Patent Document

[Patent Document 1] JP07-51948A
[Patent Document 2] JP07-314258A
[Patent Document 3] JP2011-062811A

DISCLOSURE OF THE INVENTION

Problems to be Solved by the Invention

The electrochemical machining methods disclosed in Patent Documents 1 and 2 have an advantage that adjusting an exposed angle, a potential, and a direction of the electrode at a tip end allows a direction of the hole to be freely changed; however, a structure of an electrode tool is complicated to make it difficult to form a hole having a diameter equal to or less then a certain diameter. Further, in the electrochemical machining method disclosed in Patent Document 3, an electrode that has been previously bent in a fixed manner is used to perform machining, so that a shape of the hole is limited to a shape of the previously fixed electrode.

An object of the present invention is to provide an electrode capable of increasing a degree of freedom in machining shape with a simple structure, an electrochemical machining apparatus using the electrode, an electrochemical machining method, and a product machined by the method.

Means for Solving the Problems

An electrode according to an embodiment of the present invention includes: a core tube formed of a material by which a second hole having a direction or a curvature different from that of a first hole having a predetermined curvature can be formed continuously from the first hole; and a coating fixed to an outer periphery of the core tube.

In the electrode according to the embodiment of the present invention, the core tube is formed of a beta titanium alloy.

In the electrode according to the embodiment of the present invention, the core tube is formed of an alpha-beta titanium alloy.

In the electrode according to the embodiment of the present invention, the core tube is formed of an alpha-beta titanium alloy obtained by changing a metal crystal composition of the beta titanium alloy through machining into pipe shape and heating.

In the electrode according to the embodiment of the present invention, the core tube is formed of an alpha titanium alloy obtained by changing a metal crystal composition of the beta titanium alloy or alpha-beta titanium alloy through machining into pipe shape and heating.

In the electrode according to the embodiment of the present invention, the core tube is formed of a shape memory alloy.

An electrochemical machining apparatus according to an embodiment of the present invention includes: a table on which a workpiece is placed; the above electrode; an electrode drive section that drives the electrode in a reciprocating manner with respect to the workpiece; a controller that applies a predetermined voltage to the electrode and the workpiece and controls the electrode drive section; and an electrolyte supplied to the workpiece from the core tube of the electrode.

An electrochemical machining method according to an embodiment of the present invention includes the steps of: forming a first hole in a workpiece by using an electrode having a predetermined curvature; and forming, in a continuous manner from the first hole, a second hole by rotating the electrode about a predetermined axis and then making the electrode pass through the first hole.

An electrochemical machining method according to an embodiment of the present invention includes the steps of: forming a first hole in a workpiece by using a first electrode having a predetermined first curvature; and forming, in a continuous manner from the first hole, a second hole by making a second electrode having a second curvature different from the first curvature of the first electrode pass through the first hole.

A machined product according to an embodiment of the present invention is machined by the electrochemical machining method as the above method.

Advantages of the Invention

The electrode according to the embodiment of the present invention has the core tube formed of a material by which the second hole having a direction or a curvature different from that of the first hole having a predetermined curvature can be formed continuously from the first hole and coating fixed to the outer periphery of the core tube. Thus, it is possible to simply and rapidly form a hole in which the direction or the curvature is changed halfway.

Further, in the electrode according to the present embodiment, the core tube is formed of the beta titanium alloy, the core tube becomes high in yield stress and high in strength, and becomes low in Young's modulus to allow easy deformation. That is, the core tube can maintain its shape stably when external force is small and can change its shape flexibly in accordance with the hole shape to allow passage through the holes with different shapes.

Further, in the electrode according to the embodiment of the present invention, the core tube is formed of the alpha-beta titanium alloy, so that the core tube becomes high in yield stress and high in strength, and becomes low in Young's modulus to allow easy deformation. That is, the core tube can maintain its shape stably when external force is small and can change its shape flexibly in accordance with the hole shape to allow passage through the holes with different shapes.

Further, in the electrode according to the embodiment of the present invention, the core tube is formed of the alpha-beta titanium alloy obtained by changing the metal crystal composition of the beta titanium alloy through machining into pipe shape and heating, so that the core tube becomes high in yield stress and high in strength, and becomes low in Young's modulus to allow easy deformation. That is, the core tube can maintain its shape stably when external force is small and can change its shape flexibly in accordance with the hole shape to allow passage through the holes with different shapes.

Further, in the electrode according to the embodiment of the present invention, the core tube is formed of the alpha titanium alloy obtained by changing the metal crystal composition of the beta titanium alloy or alpha-beta titanium alloy through machining into pipe shape and heating, so that the core tube becomes high in yield stress and high in strength, and becomes low in Young's modulus to allow easy deformation. That is, the core tube 41 can maintain its shape stably when external force is small and can change its shape flexibly in accordance with the hole shape to allow passage through the holes with different shapes.

Further, in the electrode according to the embodiment of the present invention, the core tube is formed of the shape memory alloy. Thus, it is possible to change, depending on temperature, a state of the core tube between a state where a shape thereof can be stably maintained and a state where the shape thereof can be flexibly changed in accordance with a shape of the hole.

An electrochemical machining apparatus according to an embodiment of the present invention includes a table on which the workpiece is placed, the electrode, an electrode drive section that drives the electrode in a reciprocating manner with respect to the workpiece, a controller that applies a predetermined voltage to the electrode and workpiece and controls the electrode drive section, and an electrolyte supplied to the workpiece from the core tube of the electrode. With this configuration, it is possible to simply and rapidly form a hole having a predetermined shape only by changing a shape of the electrode without using a complicated electrode structure, a complicated structure of a machining apparatus, and complicated control.

Further, an electrochemical machining method according to an embodiment of the present invention includes a step of forming a first hole in a workpiece by using an electrode having a predetermined curvature and a step of forming, in a continuous manner from the first hole, a second hole by rotating the electrode about a predetermined axis and then making the electrode pass through the first hole. With this method, it is possible to change a direction of the hole halfway, thereby making it possible to increase a degree of freedom in machining shape.

Further, an electrochemical machining method according to an embodiment of the present invention includes a step of forming a first hole in a workpiece by using a first electrode having a predetermined first curvature and a step of forming, in a continuous manner from the first hole, a second hole by making a second electrode having a second curvature different from the first curvature of the first electrode pass through the first hole. With this method, it is possible to change a direction of the hole halfway, thereby making it possible to increase a degree of freedom in machining shape.

A machined product according to an embodiment of the present invention is machined by the electrochemical machining method, so that a hole in which the direction or curvature is changed halfway can be formed, thereby obtaining a machined product with a high degree of freedom in shape.

BEST MODE FOR CARRYING OUT THE INVENTION

Figure 1:
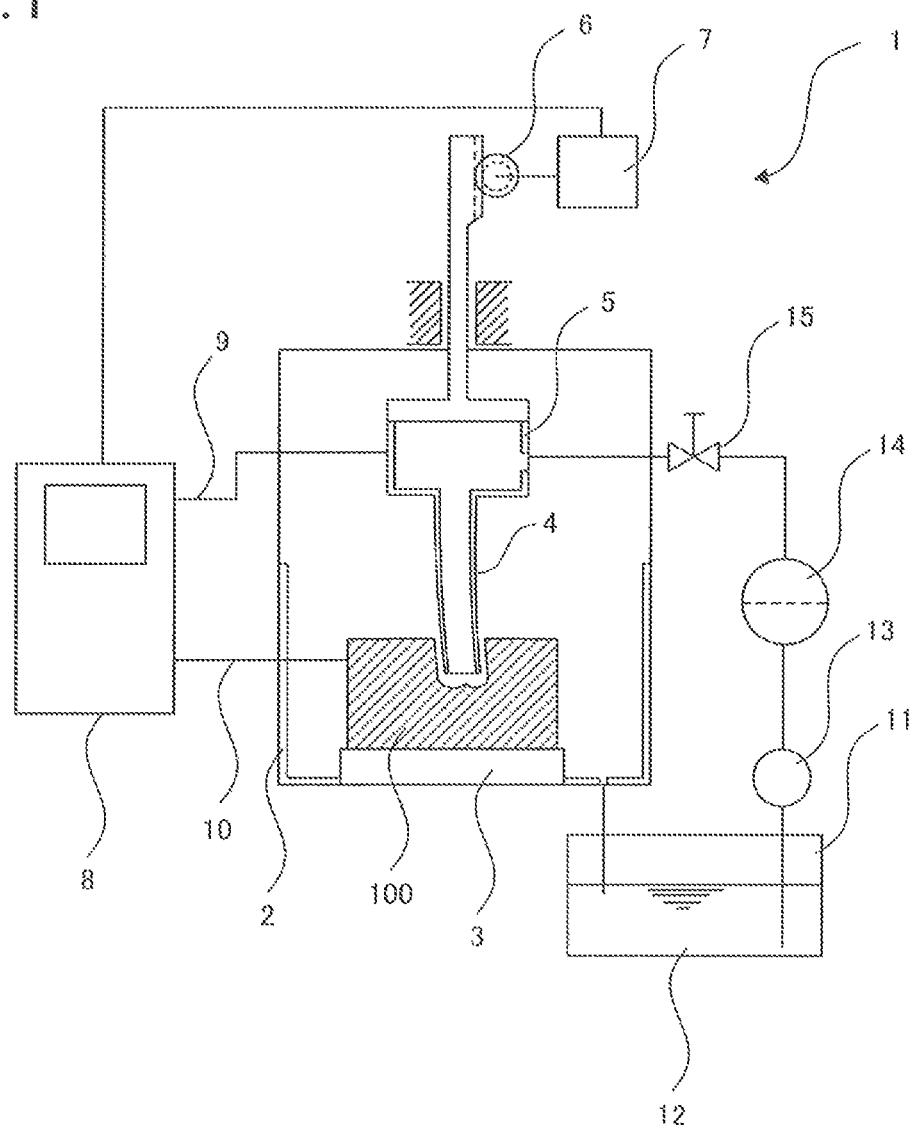
FIG. 1 is a schematic view illustrating an electrochemical machining apparatus 1 according to an embodiment of the present invention.

FIG. 1 is a schematic view illustrating an electrochemical machining apparatus 1 according to an embodiment of the present invention.

As illustrated in FIG. 1, the electrochemical machining apparatus 1 as an example of the present embodiment is an apparatus that uses a hollow electrode. The electrochemical machining apparatus 1 includes a machining vessel 2, a table 3, an electrode 4, a holder 5, a rack-and-pinion pair 6, a servomotor 7, a controller 8, lead wires 9 and 10, a tank 11, an electrolyte 12, a pump 13, a filter 14 and a flow control valve 15 and machines a workpiece 100.

The workpiece 100 is formed of a metal material such as steel and placed/fixed onto the table 3 in the machining vessel 2. The electrode 4 has a cross-sectional outer contour formed into a hollow tubular shape corresponding to an inner contour of a hole to be formed and is supported by the holder 5 so as to be reciprocatable with respect to the workpiece 100. The electrode 4 and the holder 5 are integrally formed and driven under control of an electrode drive section constituted by the rack-and-pinion pair 6 and the servo motor 7.

The controller 8 applies a predetermined DC voltage to the electrode 4 and the workpiece 100 through the lead wires 9 and 10. The controller 8 is electrically connected to the servo motor 7 to control drive of the servo motor 7.

The tank 11 stores the electrolyte 12. The electrolyte 12 is supplied to the holder 5 and the electrode 4 through the pump 13, the filter 14, and the flow control valve 15. The electrolyte 12 discharged from the machining vessel 2 is returned to the tank 11.

The electrolyte 12 is, e.g., a sulfuric acid aqueous solution (18% by weight). The electrolyte 12 circulates, through the pump 13, between the machining vessel 2 and the tank 11. The controller 8 applies a positive DC voltage to the workpiece and a negative DC voltage to the electrode through the lead wires 9 and 10. It is preferable to periodically apply a reverse voltage so as to maintain the state of a tip end of the electrode. Alternatively, the voltage may be intermittently applied. When the controller 8 feeds the electrode 4 to the workpiece 10 in this state, the metal of the workpiece 100 side is eluted into the electrolyte 12 by electrolytic action, thereby allowing a hole having a predetermined dimension to be formed in the workpiece 100.

With the above electrochemical machining method, it is possible to form, without generating internal stress in the workpiece 100, a hole having a minute dimension equal to or less than, e.g., 1 mm in diameter with a depth-to-diameter ratio of 500:1 where the workpiece is not metallurgically affected, which is effective in forming a large number of minute-diameter cooling holes indispensable to a gas turbine blade.

Figure 2:
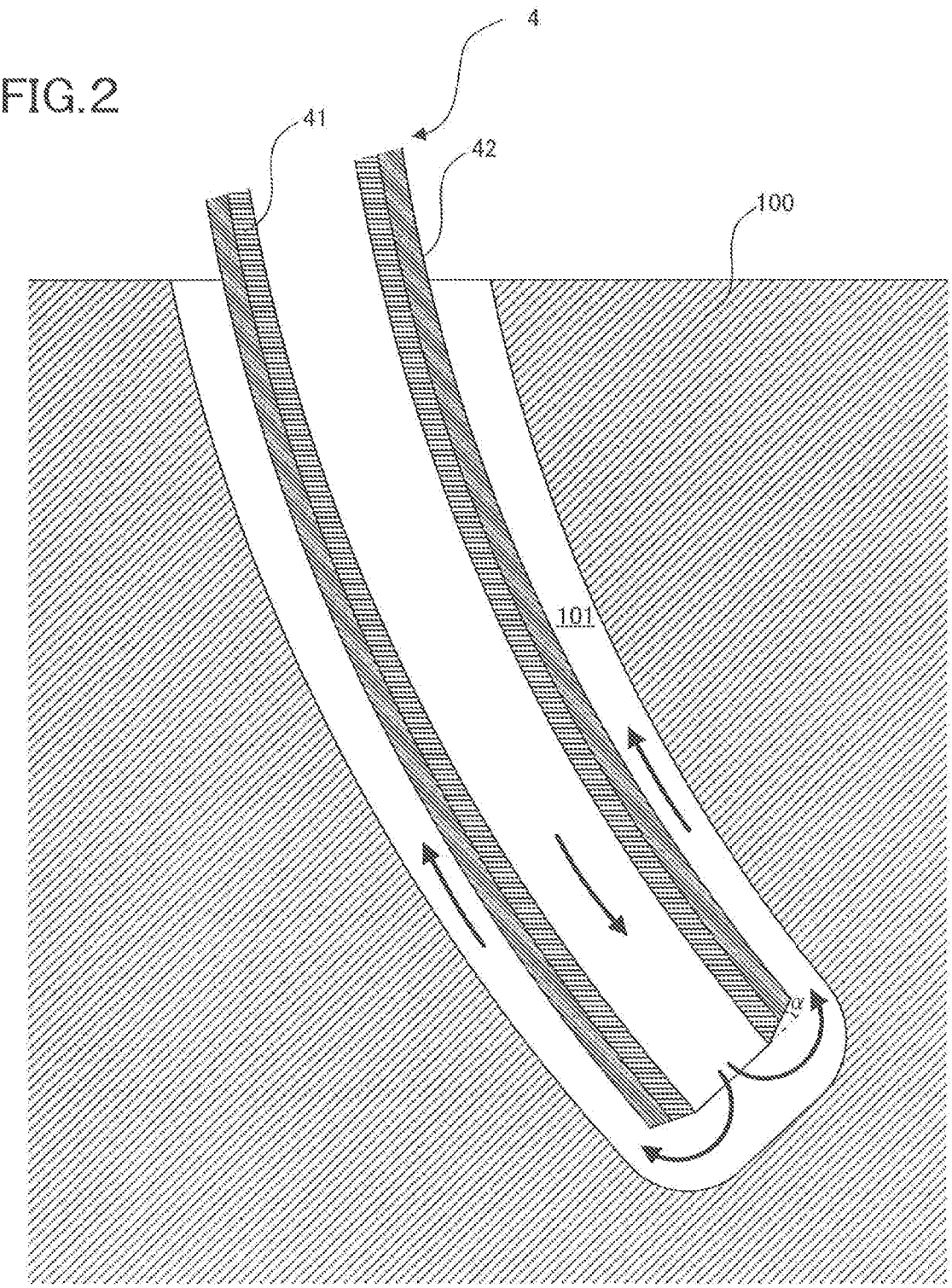
FIG. 2 is an enlarged cross-sectional view illustrating a tip end of an electrode 4 illustrated in FIG. 1.

FIG. 2 is an enlarged cross-sectional view illustrating the tip end of the electrode 4 illustrated in FIG. 1.

As illustrated in FIG. 2, the electrode 4 has a core tube 41, to an outer periphery of which a coating 42 formed of an acid-resistant insulating material is fixed. The tip end of the electrode 4 is formed into a conical surface having an inclination angle of α. In this case, α is set in a range of 10° to 15°. Arrows in FIG. 2 represents a flow of the electrolyte 12.

The core tube 41 is formed of a material having a predetermined curvature including 0 and capable of maintaining its shape when being deformed although not plastically deformed. That is, the core tube 41 is formed of a material by which a second hole having a direction or a curvature different from that of a first hole having a predetermined curvature can be formed continuously from the first hole. It is preferable to use, for the core tube 41, a material scarcely dissolving in the electrolyte and having high yield strength for increasing a degree of freedom in shape.

For example, the core tube 41 is preferably formed of a beta titanium alloy. The beta titanium alloy is excellent in workability as compared with other titanium alloys and can be formed into a pipe shape. Alternatively, the beta titanium alloy may be machined into a pipe shape followed by heating to change a metal crystal composition to an alpha titanium alloy or an alpha-beta titanium alloy.

Further alternatively, the alpha-beta titanium alloy including the beta titanium alloy may be machined into a pipe shape. Further alternatively, the alpha-beta titanium alloy may be machined followed by heating to change a metal crystal composition to the alpha titanium alloy.

Further, the core tube 41 may be formed of a shape memory alloy. By forming the core tube 41 using the shape memory alloy, it is possible to change, depending on temperature, a state of the core tube 41 between a state where a shape thereof can be stably maintained and a state where the shape thereof can be flexibly changed in accordance with a shape of the hole.

As described above, with the electrode 4 according to the present embodiment, it is possible to simply and rapidly form a machined hole having a predetermined shape without using a complicated electrode structure, a complicated structure of a machining apparatus, and complicated control. For example, only by changing the direction of the electrode 4 or only by replacing the electrode 4 with another electrode 4' having a predetermined curvature, it is possible to simply and rapidly form a hole 101 having a predetermined direction or a predetermined curvature.

Further, by using, as a material of the core tube 41, the beta titanium alloy, alpha-beta titanium alloy, or alpha titanium alloy or alpha-beta titanium alloy obtained by changing the metal crystal composition of the beta titanium alloy or alpha-beta titanium alloy through machining into pipe shape and heating, the core tube 41 becomes high in yield stress and high in strength, and becomes low in Young's modulus to allow easy deformation. That is, the core tube 41 can maintain its shape stably when external force is small and can change its shape flexibly in accordance with the hole shape to allow passage through holes with different shapes.

The following describes the electrochemical machining method using the bent electrode 4 having a predetermined curvature.

Figure 3:
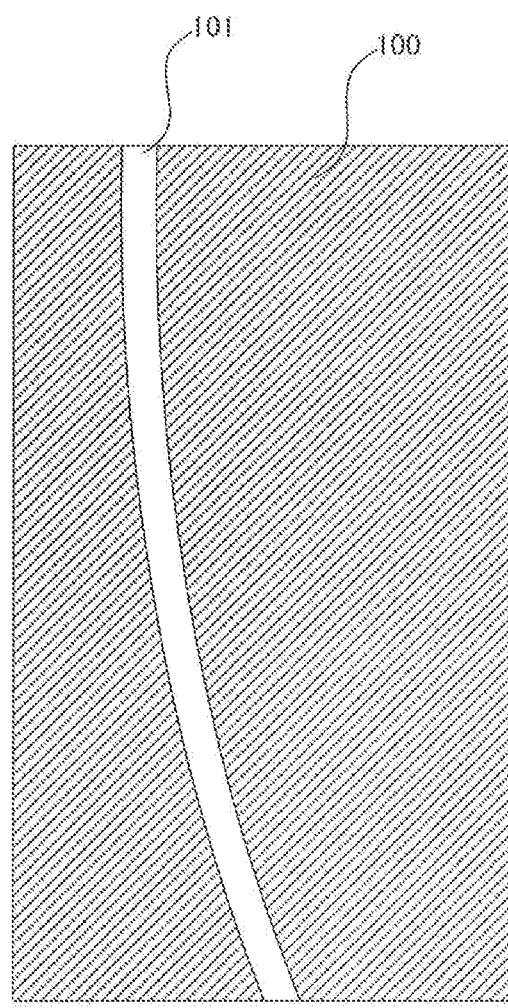
FIG. 3 is a view illustrating a hole 101 formed by an electrochemical machining method.

FIG. 3 is a view illustrating a hole 101 formed by the electrochemical machining method.

The bent electrode 4 having a predetermined curvature is set in the electrochemical machining apparatus 1 illustrated in FIG. 1, and the workpiece 100 is machined. Then, as illustrated in FIG. 2, the bent hole 101 having the same curvature as that of the electrode 4 starts being formed. The machining is continued as it is, and then, as illustrated in FIG. 3, the hole 101 having the same curvature as that of the electrode 4 illustrated in FIG. 2 is formed in the workpiece 100.

Thus, with the electrochemical machining method, only by setting the curvature of the electrode 4, it is possible to simply and rapidly form the hole 101 having a predetermined curvature without using a complicated electrode structure, a complicated structure of a machining apparatus, and complicated control.

Figure 4:
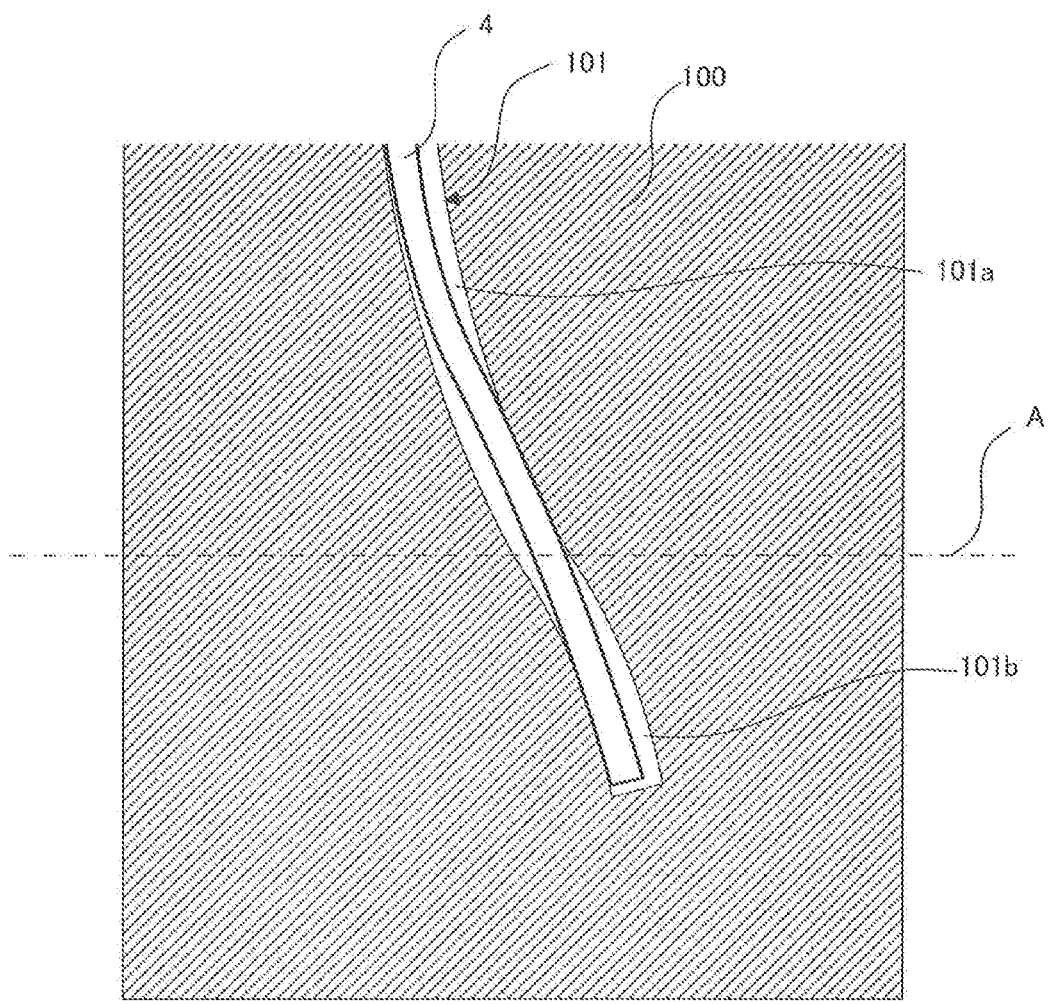
FIG. 4 is a view illustrating the hole 101 being formed by the electrochemical machining method according to a first embodiment.
Figure 5:
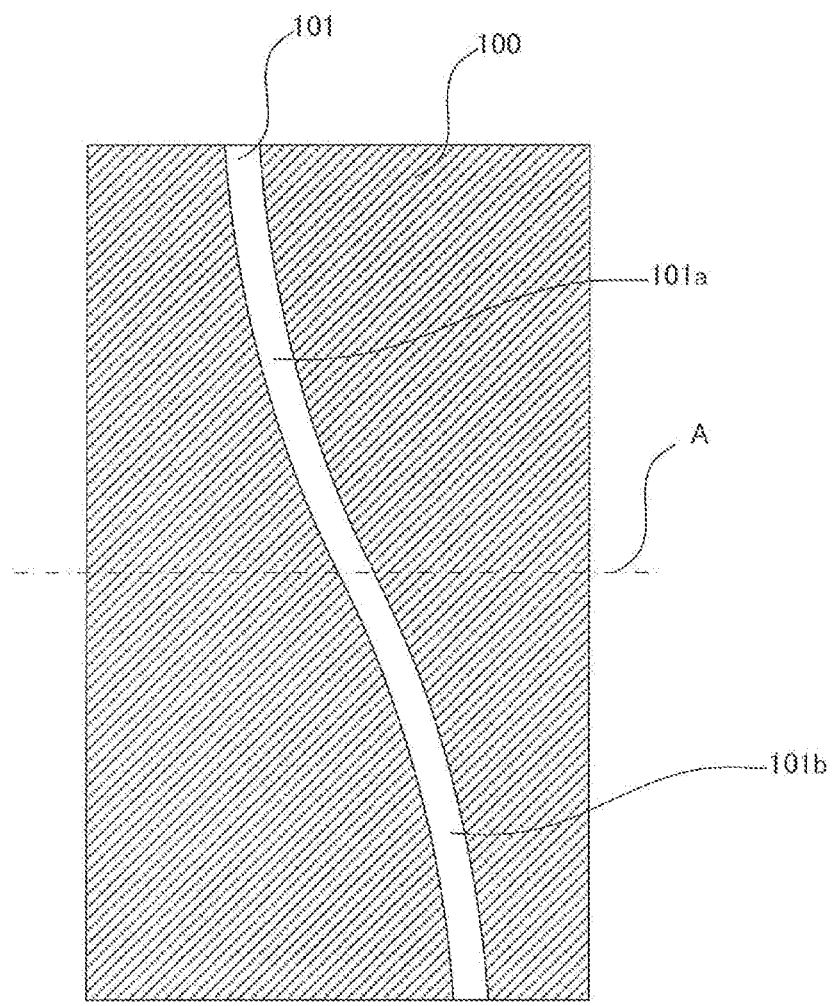
FIG. 5 is a view illustrating the hole 101 formed by the electrochemical machining method according to the first embodiment.

FIG. 4 is a view illustrating the hole 101 being formed by the electrochemical machining method according to the first embodiment. FIG. 5 is a view illustrating the hole 101 formed by the electrochemical machining method according to the first embodiment.

In the electrochemical machining method according to the first embodiment, the electrode 4 is rotated about a predetermined axis in the middle of machining. For example, the bent electrode 4 having a predetermined curvature is set as illustrated in FIG. 2, and machining is applied to form a first hole 101a until the electrode 4 reaches a change position A illustrated in FIG. 4. Thereafter, when the electrode 4 is rotated about a predetermined axis at the change position A, the electrode 4 continues machining with the entire body thereof flexibly deformed in accordance with a shape of the formed first hole 101a and the tip end thereof directed to the changed direction. As a result, as illustrated in FIG. 5, a bent second hole 101b having a direction different from that of the first hole 101a is formed so as to extend from the change position A.

As described above, with the electrochemical machining method according to the first embodiment, the direction of the hole 101 can be changed in the middle of machining, thus making it possible to increase a degree of freedom in machining shape.

The direction of the hole 101 may be changed any number of times.

Figure 6:
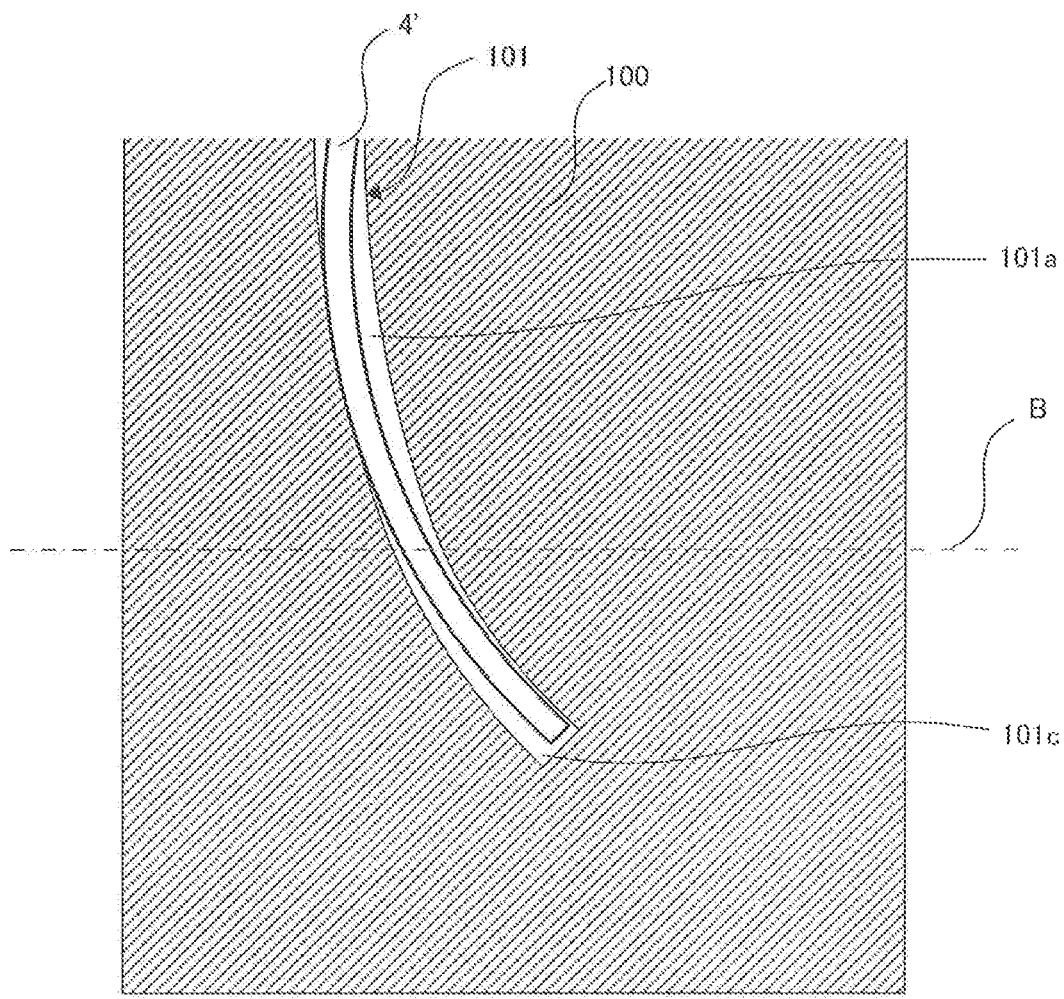
FIG. 6 is a view illustrating the hole 101 being formed by the electrochemical machining method according to a second embodiment.
Figure 7:
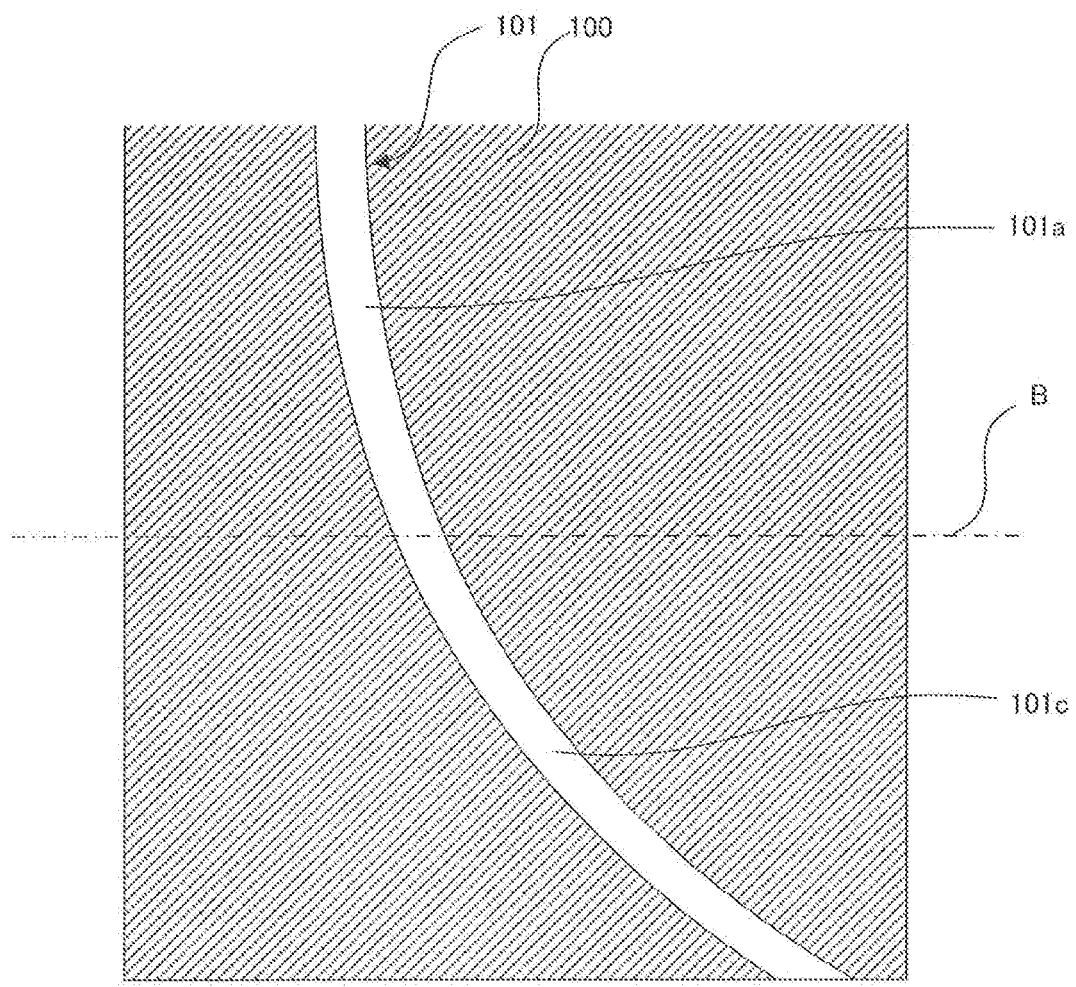
FIG. 7 is a view illustrating the hole 101 formed by the electrochemical machining method according to the second embodiment.

FIG. 6 is a view illustrating the hole 101 being formed by the electrochemical machining method according to a second embodiment. FIG. 7 is a view illustrating the hole 101 formed by the electrochemical machining method according to the second embodiment.

In the electrochemical machining method according to the second embodiment, a first electrode 4 having a predetermined first curvature is replaced by a second electrode 4' having a second curvature different from the first curvature of the first electrode 4 in the middle of machining to change a curvature of the hole 101. For example, the first electrode 4 having the predetermined first curvature is set as illustrated in FIG. 2, and machining is applied to form a first hole 101*a* having the first curvature until the first electrode 4 reaches a change position B illustrated in FIG. 6. Thereafter, the first electrode 4 is replaced by the second electrode 4' having the second curvature different from the first curvature of the first electrode 4 at the change position B. Then, the second electrode 4', the tip end thereof set to the second curvature, continues formation of a second hole 101*c* with the entire body thereof flexibly deformed in accordance with the shape of the formed first hole 101*a*. As a result, as illustrated in FIG. 7, the hole 101 whose curvature is changed at the position B is formed.

As described above, with the electrochemical machining method according to the second embodiment, the direction of the hole 101 can be changed in the middle of machining, thus making it possible to increase a degree of freedom in machining shape.

A procedure may be adopted, in which the second hole 101*c* having a smaller curvature is formed first, followed by formation of the first hole 101*a* having a larger curvature. Alternatively, the second hole 101*c* having a smaller curvature and first hole 101*a* having a larger curvature may be alternately formed. Further, the direction of the hole 101 may be changed any number of times.

Figure 8:
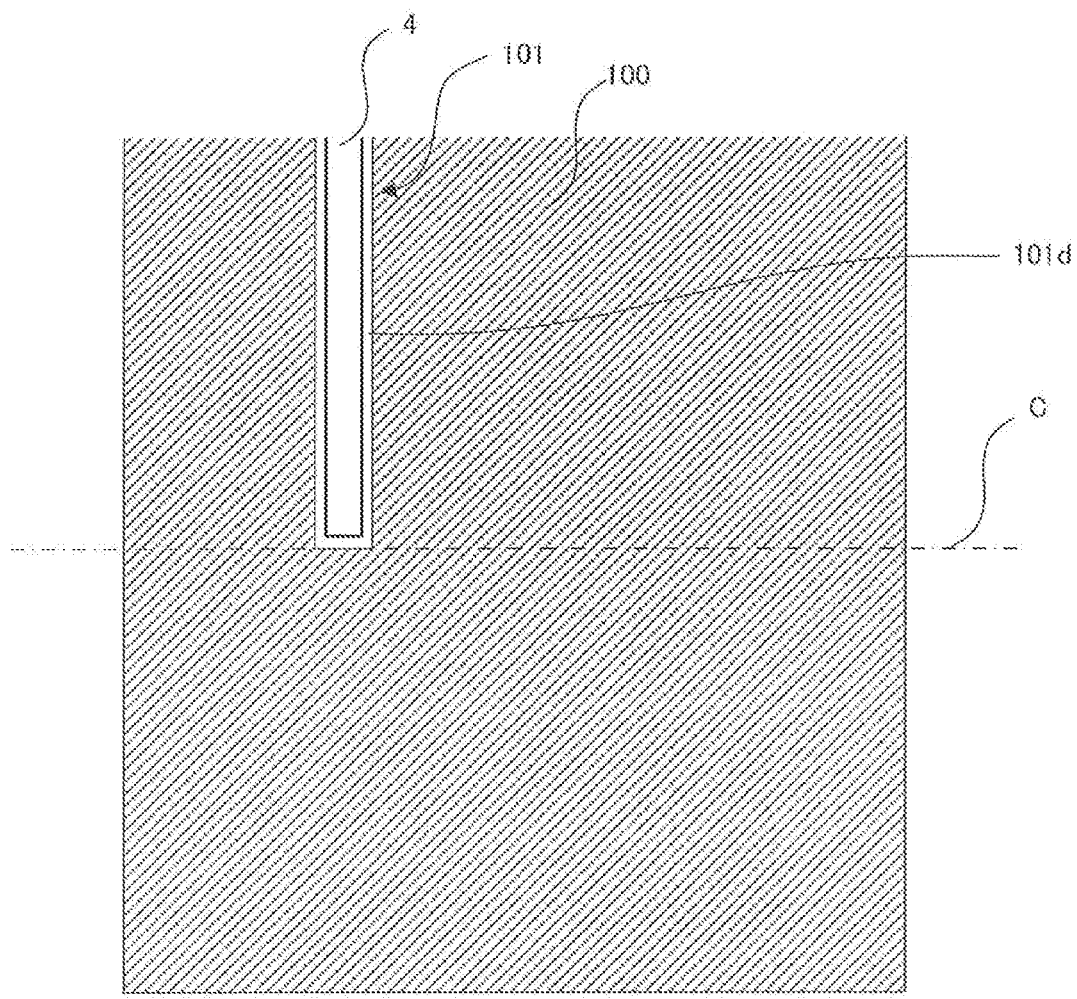
FIG. 8 is a view illustrating a linear first hole 101*d* being formed by the electrochemical machining method according to a third embodiment.
Figure 9:
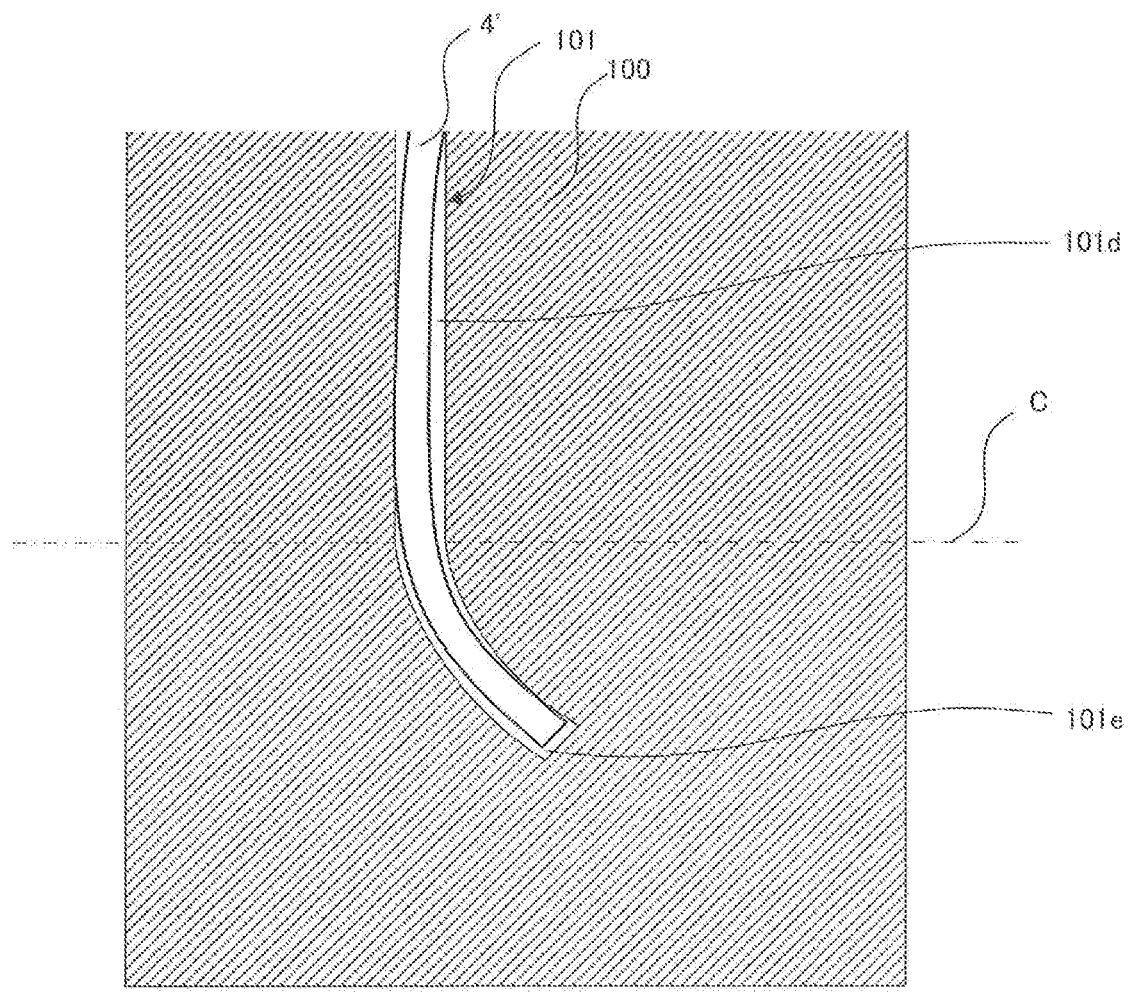
FIG. 9 is a view illustrating a bent second hole 101*e* being formed by the electrochemical machining method according to a third embodiment.
Figure 10:
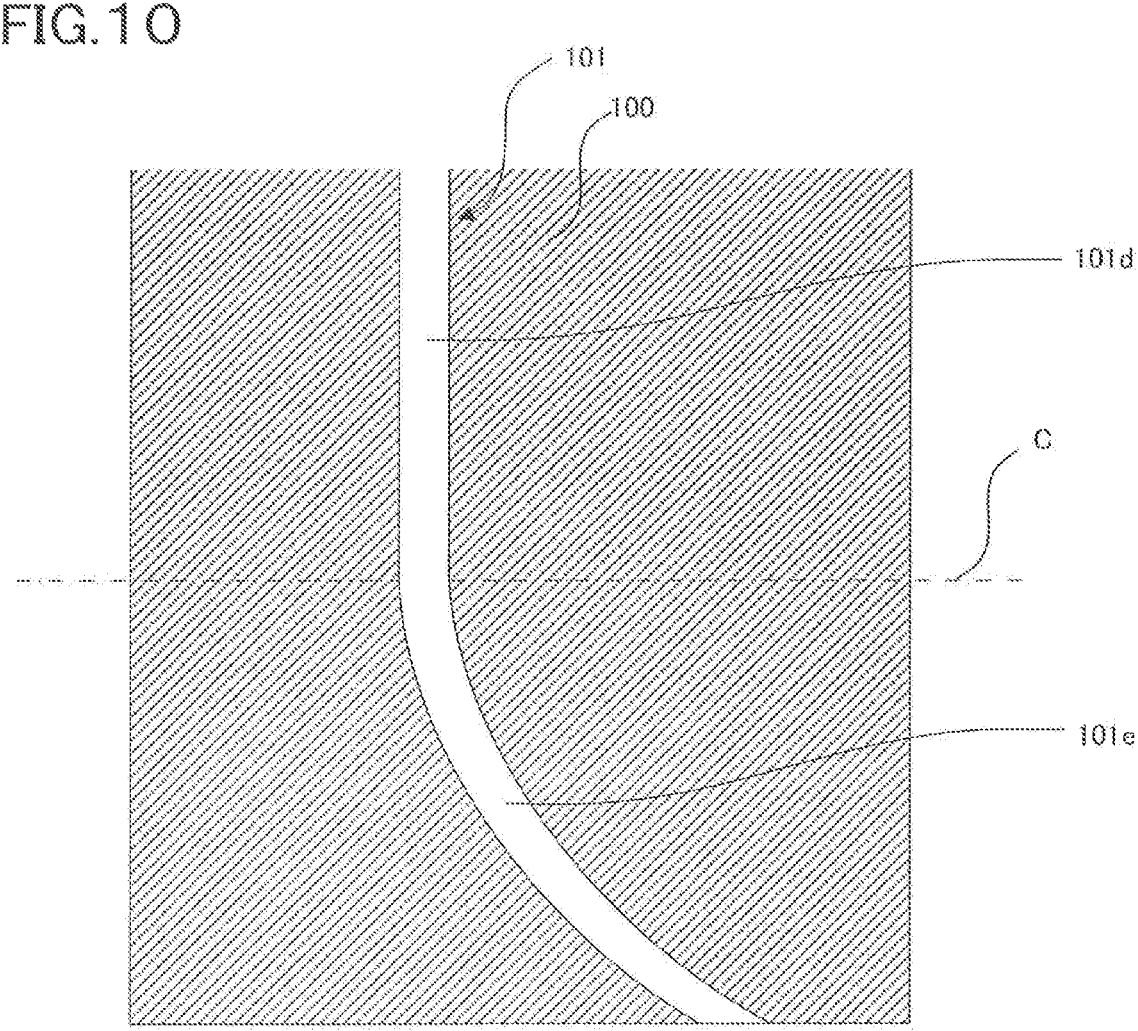
FIG. 10 is a view illustrating a hole 101 formed by the electrochemical machining method according to the third embodiment.

FIG. 8 is a view illustrating a linear first hole 101*d* with the curvature set to 0 being formed halfway by the electrochemical machining method according to a third embodiment. FIG. 9 is a view illustrating a bent second hole 101*e* being formed by the electrochemical machining method according to a third embodiment. FIG. 10 is a view illustrating a hole 101 formed by the electrochemical machining method according to the third embodiment.

As illustrated in FIG. 8, in the electrochemical machining method according to the third embodiment, a linear first electrode 4 having a predetermined curvature of 0 is used first, and then the first electrode 4 is replaced by a second electrode 4' having a predetermined curvature different from the curvature of the first electrode 4 in the middle of machining. For example, the linear first electrode 4 is set, and machining is performed until the first hole 101*d* reaches a change position C illustrated in FIG. 8. Thereafter, the first electrode 4 is replaced by the second electrode 4' at the change position C. Then, as illustrated in FIG. 9, the second electrode 4' continues machining with the entire body thereof flexibly deformed in accordance with the shape of the formed linear first hole 101*d* and the tip end thereof set to a predetermined curvature. As a result, as illustrated in FIG. 10, the bent second hole 101*e* having a predetermined curvature is formed so as to extend from the change position C.

As described above, with the electrochemical machining method according to the third embodiment, the hole shape can be changed from the linear first hole 101*d* to the bent second hole 101*e* in the middle of machining, thus making it possible to increase a degree of freedom in machining shape.

A procedure may be adopted, in which the bent second hole 101*e* is formed first, followed by formation of the linear first hole 101*d*. Alternatively, the linear first hole 101*d* and bent second hole 101*e* may be alternately formed. Further, the change between the linear first hole 101*d* and bent second hole 101*e* may be made any number of times.

The above-described electrochemical machining methods of the respective embodiment may be combined. For example, a procedure may be adopted, in which the curvature of the electrode 4 is changed, followed by a change in direction thereof. Further, a procedure may be adopted, in which first the linear electrode having a predetermined curvature of 0 is used to perform machining, then the bent electrode having a predetermined curvature other than 0 is used to perform machining, and the direction of the bent electrode is changed.

Figure 11:
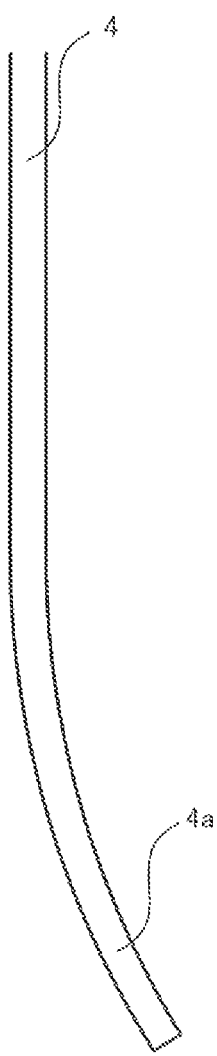
FIG. 11 is a view illustrating another example of the electrode 4.

FIG. 11 is a view illustrating another example of the electrode 4.

The electrode need not be deformed over the entire length thereof but may be deformed only at its tip end. For example, it is not necessary to add a predetermined curvature over the entire length, but a structure in which a predetermined curvature is added only to an area of several cm around a tip end portion 4*a* as illustrated in FIG. 11 may be adopted.

With the electrochemical machining apparatus 1 according to the present embodiment, an engine part, an industrial product, a machine device, a metal die, and the like can be machined as a machined product.

First, with the electrochemical machining apparatus 1 according to the present embodiment, a fluid passage of an engine part such as a turbine blade can be formed.

Conventionally, it is difficult to form a narrow and bent hole inside an engine part such as a turbine blade. In particular, it is impossible to form a narrow hole in a flange portion. To cope with this problem, a curved groove is formed in a cross section of the flange portion. Further, when a linear cooling hole is formed inside the engine part, it becomes difficult to reduce a thickness of the engine part.

Using the electrode 4 of the electrochemical machining apparatus 1 according to the present embodiment allows formation of the narrow and bent cooling hole inside the engine part including the flange portion, so that it is possible to reduce the thickness of the engine part to thereby achieve reduction of fluid resistance of cooling fluid and light weight of the engine part.

Further, in the engine part, by connecting a plurality of cooling holes, flow of the cooling fluid can be improved to thereby enhance cooling efficiency. However, some conventional engine parts, such as a turbine blade, include a curved surface, which makes it difficult to connect the plurality of cooling holes in terms of machining.

Using the electrode 4 of the electrochemical machining apparatus 1 according to the present embodiment allows formation of a hole connecting the cooling tubes according to the curved surface of the engine part, thereby enhancing cooling efficiency.

Further, some engine parts are designed to discharge cooling fluid from a cooling flow passage to the surface thereof so as to enhance cooling performance of the surface. However, conventionally, it is difficult to open a curved cooling hole to the surface of the engine part from inside thereof.

Using the electrode 4 of the electrochemical machining apparatus 1 according to the present embodiment allows formation of a hole while changing the curvature thereof inside the engine or formation of a hole having both a linear part and a bent part. That is, it is possible to open the cooling holes formed vertically and horizontally inside the engine part to the surface thereof.

Further, when the cooling holes have the uniform length from a surface of a component whose temperature easily rises, uniform cooling can be achieved to enhance cooling performance of the component. However, conventionally, it is difficult to form, inside the component, a hole in accordance with the curvature of the surface of the component.

Using the electrode 4 of the electrochemical machining apparatus 1 according to the present embodiment allows a hole to be formed inside the component in accordance with the curvature of the surface of the component, thereby allowing uniform cooling of the component.

Further, conventionally, a nozzle skirt of a rocket requires a complicated structure such as fixation of a cooling tube by brazing or welding, or a double structure in which coolant is made to flow at the inner side.

Using the electrode 4 of the electrochemical machining apparatus 1 according to the present embodiment allows a hole to be directly formed at a position to be cooled of a component to be cooled, thereby simplifying a component structure and achieving reduction in the number of components, cost reduction, enhancement in strength, enhancement in cooling performance, and the like.

Examples of the engine part include an aircraft jet engine part, a rocket engine part, industrial gas turbine engine part. Examples of a hole to be formed in the aircraft jet engine part include a turbine blade cooling hole, a nozzle cooling hole, a fuel injection nozzle, a segment cooling hole, a lubricating oil line, and a fuel oil line. Examples of a hole to be formed in the rocket engine part include a liquid fuel passage, a nozzle cooling passage, and a lubricating oil line. Examples of a hole to be formed in the industrial gas turbine engine part include a turbine blade cooling hole, a nozzle cooling hole, a fuel injection nozzle, a segment cooling hole, a lubricating oil line, and a fuel oil line.

Secondly, with the electrochemical machining apparatus 1 according to the present embodiment, an industrial product can be machined.

Conventionally, it is impossible to form a hole having a shape obtained by combining two or more curvatures inside a component. Thus, in order to form the hole having a shape obtained by combining two or more curvatures inside a component, such as hydraulic piping of hydraulic equipment, oil piping for lubricating, flow passage piping for cooling, it is necessary to adopt an inefficient structure in which the component is divided into two parts, grooves are formed in surfaces of the respective two parts, and then the two parts are connected to each other.

Using the electrode 4 of the electrochemical machining apparatus 1 according to the present embodiment allows increase in a degree of freedom in machining shape of the hole, thereby forming the hole having a shape obtained by combining two or more curvatures inside a component, allowing simplification of a final component, enhancement in strength thereof, and reduction in size thereof.

Examples of the industrial product include an oil line of an automobile engine part, an oil or water cooling line of a turbo instrument, a cooling line for an exhausting part, an oil line for a hydraulic system, an oil line for lubricating oil, and a cooling passage connected to a valve.

Further, with the electrode 4 of the electrochemical machining apparatus 1 according to the present embodiment, a machine device and a metal die can be machined.

Conventionally, it is difficult to form a cooling passage inside a metal die having a complicated shape and to form a hydraulic pressure passage or an air pressure passage inside a machine device by forming a hole inside thereof.

Using the electrode 4 of the electrochemical machining apparatus 1 according to the present embodiment allows increase in a degree of freedom in machining shape of the hole to thereby achieve formation of a complicated shape.

The electrode 4 according to the present embodiment has the core tube 41 formed of a material by which the second hole having a direction or a curvature different from that of the first hole having a predetermined curvature can be formed continuously from the first hole and coating 42 fixed to the outer periphery of the core tube 41. Thus, it is possible to simply and rapidly form a hole having a predetermined shape without using a complicated electrode structure, a complicated structure of a machining apparatus, and complicated control. For example, only by changing the direction of the electrode 4 or only by replacing the electrode 4 by another electrode 4' having a predetermined curvature, it is possible to simply and rapidly form a hole 101 having a predetermined direction or a predetermined curvature.

Further, in the electrode 4 according to the present embodiment, the core tube 41 is formed of the beta titanium alloy, so that the core tube 41 becomes high in yield stress and high in strength, and becomes low in Young's modulus to allow easy deformation. That is, the core tube 41 can maintain its shape stably when external force is small and can change its shape flexibly in accordance with the hole shape to allow passage of holes with different shapes.

Further, in the electrode 4 according to the present embodiment, the core tube 41 is formed of the alpha-beta titanium alloy, so that the core tube 41 becomes high in yield stress and high in strength, and becomes low in Young's modulus to allow easy deformation. That is, the core tube 41 can maintain its shape stably when external force is small and can change its shape flexibly in accordance with the hole shape to allow passage of holes with different shapes.

Further, in the electrode 4 according to the present embodiment, the core tube 41 is formed of the alpha-beta titanium alloy obtained by changing the metal crystal composition of the beta titanium alloy through machining into pipe shape and heating, so that the core tube 41 becomes high in yield stress and high in strength, and becomes low in Young's modulus to allow easy deformation. That is, the core tube 41 can maintain its shape stably when external force is small and can change its shape flexibly in accordance with the hole shape to allow passage of holes with different shapes.

Further, in the electrode 4 according to the present embodiment, the core tube 41 is formed of the alpha titanium alloy obtained by changing the metal crystal composition of the beta titanium alloy or alpha-beta titanium alloy through machining into pipe shape and heating, so that the core tube 41 becomes high in yield stress and high in strength, and becomes low in Young's modulus to allow easy deformation. That is, the core tube 41 can maintain its shape stably when external force is small and can change its shape flexibly in accordance with the hole shape to allow passage of holes with different shapes.

Further, in the electrode 4 according to the present embodiment, the core tube 41 is formed of the shape memory alloy. Thus, it is possible to change, depending on temperature, a state of the core tube 41 between a state where a shape thereof can be stably maintained and a state where the shape thereof can be flexibly changed in accordance with a shape of the hole 101.

The electrochemical machining apparatus 1 includes the table on which the workpiece 100 is placed, electrode 4, electrode drive sections 6 and 7 that drive the electrode 4 in a reciprocating manner with respect to the workpiece 100, controller 8 that applies a predetermined voltage to the electrode 4 and workpiece 100 and controls the electrode drive sections 6 and 7 and electrolyte 12 supplied to the workpiece 100 from the core tube 41 of the electrode 4. With this configuration, it is possible to simply and rapidly form a hole having a predetermined shape without using a complicated electrode structure, a complicated structure of a machining apparatus, and complicated control. For example, only by changing the direction of the electrode 4 or only by replacing the electrode 4 by another electrode 4' having a predetermined curvature, it is possible to simply and rapidly form a hole 101 having a predetermined direction or a predetermined curvature.

Further, the electrochemical machining method according to the present embodiment includes a step of forming a first hole in the workpiece by using the electrode having a predetermined curvature and a step of forming, in a continuous manner from the first hole, a second hole by rotating the electrode about a predetermined axis and then making the electrode pass through the first hole. With this method, it is possible to increase a degree of freedom in machining shape.

Further, the electrochemical machining method according to the present embodiment includes a step of forming a first hole in the workpiece by using a first electrode having a predetermined first curvature and a step of forming, in a continuous manner from the first hole, a second hole by making a second electrode having a second curvature different from the first curvature of the first electrode pass through the first hole. With this method, it is possible to increase a degree of freedom in machining shape.

The machined product according to the present embodiment is machined by the electrochemical machining method, so that a hole in which the direction or curvature is changed halfway can be formed, thereby obtaining a machined product with a high degree of freedom in shape.

The present invention is not limited to the above-described embodiments. That is, while the description of the embodiments includes specific and detailed contents for exemplification, variations or modifications may be added to these detailed contents.

INDUSTRIAL APPLICABILITY

The present invention relates to an electrode used to form a bent hole in a workpiece, an electrochemical machining apparatus using the electrode, and an electrochemical machining method and allows a hole in which a direction or a curvature is changed halfway to be formed simply and rapidly.

The invention claimed is:

1. An electrochemical machining method comprising the steps of:
   forming a first hole in a workpiece by using a first electrode having a predetermined first curvature; and
   forming, in a continuous manner from the first hole, a second hole by making a second electrode having a second curvature different from the first curvature of the first electrode pass through the first hole from the same direction in which the first electrode formed the first hole, wherein the first and second electrodes are non-linear.

2. The electrochemical machining method according to claim 1, wherein the first electrode includes a core tube formed of a beta titanium alloy that can maintain a shape thereof without plastic deformation when the shape is deformed.

3. The electrochemical machining method according to claim 2, wherein the first electrode further includes a coating formed of an acid-resistant insulating material fixed to an outer periphery of the core tube.

4. The electrochemical machining method according to claim 3, wherein a tip end of the core tube and the coating are formed into a frusto-conical shape that forms an acute angle relative to an inner surface and an obtuse angle relative to an outer surface, and inclined from the inner surface toward the outer surface at an angle of 10° to 15°.

5. The electrochemical machining method according to claim 1, wherein an electrolyte flows out of a tip of the first electrode and flows along the tip ends, running from an inner surface to an outer surface of the first electrode.

6. The electrochemical machining method according to claim 5, wherein an electrolyte flows out of a tip of the second electrode and flows along the tip ends, running from an inner surface to an outer surface of the second electrode.

* * * * *